United States Patent [19]
Edge et al.

[11] 3,932,165
[45] *Jan. 13, 1976

[54] METHOD AND APPARATUS FOR FORMING A RIBBON OF GLASS ON A BATH OF MOLTEN METAL

[75] Inventors: Charles K. Edge, Sarver; Gerald E. Kunkle, New Kensington, both of Pa.

[73] Assignee: PPG Industries, Inc., Pittsburgh, Pa.

[ * ] Notice: The portion of the term of this patent subsequent to Oct. 22, 1991, has been disclaimed.

[22] Filed: Oct. 15, 1974

[21] Appl. No.: 514,990

Related U.S. Application Data

[63] Continuation-in-part of Ser. No. 338,497, March 6, 1973, Pat. No. 3,843,346.

[52] U.S. Cl............... 65/65 A; 65/99 A; 65/182 R; 65/337
[51] Int. Cl.²......................................... C03B 18/02
[58] Field of Search...... 65/65 A, 99 A, 182 R, 347, 65/337, 136, 137, 135

[56] References Cited
UNITED STATES PATENTS

| | | | |
|---|---|---|---|
| 2,921,106 | 1/1960 | Arbeit | 65/136 |
| 3,658,505 | 4/1972 | Kunkle | 65/337 |
| 3,843,346 | 10/1974 | Edge et al. | 65/99 A |

*Primary Examiner*—Arthur D. Kellogg
*Attorney, Agent, or Firm*—E. Kears Pollock

[57] ABSTRACT

A layer of molten glass is discharged from a pool of molten glass in a glassmaking furnace and delivered along a substantially horizontal path onto a pool of molten metal in a forming chamber; the glass is then advanced along the surface of the pool of molten metal while being cooled to form a continuous sheet of glass. Prior to discharge and delivery, the molten glass is conditioned to establish an accelerated flow of molten glass in the direction of its delivery. The glass is conditioned by selectively cooling the glass at different depths in the pool of molten glass across the width of the delivery path just prior to delivery to preferentially decelerate the flow of hotter, less viscous glass at one location in the pool of molten glass relative to the flow of cooler, more viscous glass at another location in the pool. In this way the molten glass is caused to uniformly flow into a region for discharge from the pool and delivery for forming.

15 Claims, 7 Drawing Figures

METHOD AND APPARATUS FOR FORMING A RIBBON OF GLASS ON A BATH OF MOLTEN METAL

CROSS REFERENCE TO RELATED APPLICATIONS

This application is a continuation-in-part of copending application Ser. No. 338,497 filed Mar. 6, 1973 by Charles K. Edge and Gerald E. Kunkle. That application, entitled "Manufacture of Glass by Contiguous Float Process," is specifically incorporated by reference herein to show the environment and generic concepts embracing this invention. That application is now U.S. Pat. No. 3,843,346 having issued Oct. 22, 1974.

BACKGROUND OF THE INVENTION

1. Field of the Invention

This invention relates to the making of flat glass by delivering molten glass onto a pool of molten metal and supporting it thereon while cooling and forming the glass into a continuous sheet of flat glass. More particularly, this invention relates to conditioning molten glass just prior to delivery onto the molten metal for forming.

2. Description of the Prior Art

Molten glass may be delivered as a layer of molten glass onto molten metal and then formed into a continuous sheet or ribbon of glass according to the teachings of Heal, U.S. Pat. No. 710,357, or Hitchcock, U.S. Pat. No. 789,911. According to the teachings of Hitchcock and the later improvements of Edge and Kunkle disclosed in the application incorporated herein, it is useful to discharge the molten glass for forming from a pool of molten glass in a glassmaking furnace and deliver it along a substantially horizontal path onto the surface of the pool of molten metal. In one aspect the invention disclosed by Edge and Kunkle provides for cooling the molten glass beneath the surface of the pool of molten glass to establish an increased flow of molten glass at and near the surface of the pool of molten glass toward a discharge region of the pool of molten glass. This improves the quality of the formed glass sheet, particularly along its marginal edges where "herringbone" distortion is encountered in the methods disclosed by Hitchcock and Heal.

The present invention provides a method and apparatus for adapting the invention of Edge and Kunkle for improved performance when a forming chamber is connected to a glassmaking furnace in an unsymmetrical manner, particularly to allow the furnace to accommodate a plurality of forming chambers.

SUMMARY OF THE INVENTION

Glass batch materials are reacted and melted to form molten glass; the molten glass is maintained at elevated temperatures to refine it and condition it for forming by adjusting its temperature to a temperature suitable for delivery for forming; this is followed by forming.

The molten glass is maintained as a pool of molten glass in a refining or conditioning section of a glassmaking furnace during such refining and conditioning. From near the surface of the pool of molten glass a layer of molten glass is withdrawn or discharged and caused to flow through a delivery facility for delivery onto the surface of a pool of molten metal contained in a forming chamber. The layer of glass is discharged from the upper portion of the pool of molten glass while the molten glass in the pool is cooled to establish a circulating flow in the pool. The circulation of the molten glass is sufficient to enhance the flow of molten glass at and near the surface of the pool toward a discharge region of the pool and on toward the delivery facility. In this way the velocity of the flowing layer of glass is made more uniform across the width of the layer being discharged, and "herringbone" distortion associated with steep velocity gradients otherwise occuring in a delivered layer of glass is avoided.

Following delivery of the layer of molten glass onto the surface of the pool of molten metal, the layer of glass is advanced along the surface along a path substantially aligned with its delivery path which is in substantial alignment with the path of the circulating flow of the molten glass at and near the surface of the pool of molten glass in the furnace conditioner just prior to discharge and delivery. While the glass is advancing, it is cooled to form a dimensionally stable, continuous sheet of glass which continues to advance along the surface of the molten metal until it is removed from it and withdrawn from the forming chamber. The glass sheet may be removed from the forming chamber in any convenient manner, such as, for example, the methods shown by Hitchcock or by Edge and Kunkle in the incorporated application wherein a sheet of glass is shown being lifted slightly from the surface of a pool of molten metal and then conveyed horizontally therefrom. The sheet of glass may be lifted upwardly from the molten metal in the manner shown by G. E. Kunkle in copending application Ser. No. 483,508 filed June 27, 1974, which is incorporated by reference herein.

In order to make a full range of flat glass products, it has been found desirable to construct a glassmaking facility having several forming chambers connected to a common furnace. These forming chambers may be either the kind shown by Edge and Kunkle or the kind shown by Kunkle. The present process may be carried out successfully using a forming chamber connected to the refiner of an existing sheet glass furnace to which there are connected one or more sheet drawing kilns, such as Pittsburgh drawing kilns. The present process has a sufficiently broad range of acceptable temperatures for delivering molten glass for forming so that sheet drawing kilns connected to the same refiner as the present forming chamber may be operated in the conventional manner with the molten glass in the refiner having its temperatures and flows controlled to satisfy the more sensitive and less stable sheet drawing processes being carried out from the drawing kilns.

It is more preferred, however, to employ a glassmaking facility having no sheet drawing kilns attached to the furnace but, rather, having several forming chambers of the vertical lift-off kind disclosed by Kunkle or a combination of that kind with one or more horizontal lift-off forming chambers of the contiguous forming kind described in U.S. Pat. No. 3,843,346. A particularly preferred glassmaking facility comprises a furnace having a single, end-connected, wide, horizontal lift-off forming chamber and one or more side-connected, vertical lift-off forming chambers. Such a facility is ideally suited for continuously producing a full range of flat glass products of differing widths and thickness. The most common thicknesses comprising the bulk of the facility's output may be produced on the wide, horizontal lift-off forming chamber with thickness changes being infrequent. The less common thicknesses may be produced in the smaller, vertical lift-off forming chambers and thickness changes may be made frequently for these chambers. Such frequent changes cause little loss of production since the residence time and heat capacity of the short, vertical lift-off forming chambers are small.

The forming chambers that are connected to the sides of a furnace, as well as any connected at an end wall, are employed in conjunction with an apparatus for enhancing or accelerating glass flow into the forming chambers. A submerged cooler extends across the opening into each forming chamber. The cooler is inserted in the pool of molten glass in the refiner or conditioner of the furnace and beneath the elevation of the molten glass delivery facility. Such coolers are particularly beneficial in converted sheet glass furnaces having relatively deep refiners and are most useful in furnaces serving sheet glass kilns in addition to one or more of the present forming chambers.

The submerged coolers are constructed in a manner suitable for cooling molten glass closer the surface of the pool of molten glass near one side of a delivery facility than near the other side of the delivery facility. Thus, each cooler is sloped upwardly from a greater depth near one side of a delivery facility to a relatively shallow depth near the other side of the delivery facility. Even at its shallow end a cooler is maintained at an elevation beneath that of the delivery facility so that molten glass flowing forwardly toward its discharge and delivery location flows above the cooler.

The shallow end of a cooler is placed near the side of a delivery facility where, in the absence of such a cooler, the temperature of the molten glass flowing toward delivery is highest. This side of a delivery facility is generally the side closest the centerline of the glassmaking furnace to which the delivery facility is connected in the instance of a delivery facility connected to a furnace end wall that is remote from the furnace melting section; and this side of highest expected glass temperature is generally the melter side of a delivery facility connected to a furnace side wall.

The effect of using a sloped, submerged cooler, such as described here, is to establish a thermally-induced driving force in a pool of molten glass which varies across the width of a portion of a glassmaking furnace refiner or conditioner which portion acts as an entrance opening into a molten glass delivery facility which is characterized as a discharge region of the pool of glass in the furnace. The thermally induced driving force is caused to be greatest where the glass is coldest, most viscous and least responsive to flow-causing forces and least where the glass is hottest, least viscous and most responsive to flow-causing forces. In this way the acceleration of the forwardly flowing molten glass close to the surface of the pool is made substantially uniform across the width of the entrance into the delivery facility. As a result, the delivered glass is more easily and uniformly formed into a continuous sheet of glass without yielding a sheet of glass having a differing thickness across its width and without the marginal edge portions of the sheet exhibiting offensive "herringbone" distortion. The sloped submerged cooler has the effect of generally enhancing the flow of molten glass near the surface of the pool toward the discharge region of the pool while the proximity of the cooler to the surface of the pool at its most elevated end causes a local deceleration of molten glass flow due to a localized viscosity increase in the vicinity of the cooler.

This invention may be more fully appreciated with reference to the accompanying drawings.

DESCRIPTION OF THE PREFERRED EMBODIMENTS

Figure 1:
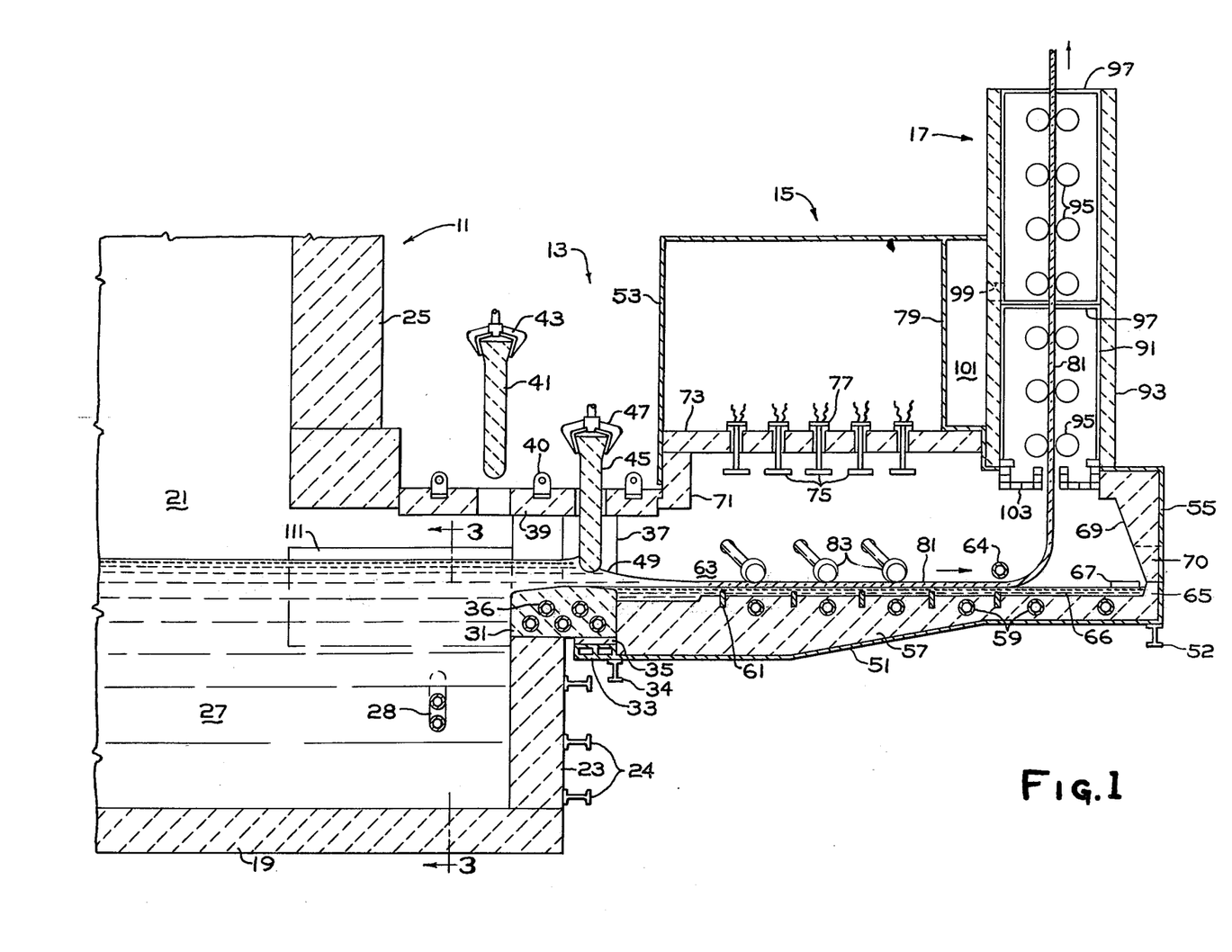
FIG. 1 is a partial longitudinal sectional elevation of a glassmaking furnace with a forming chamber connected to it at its end wall through a delivery facility showing a suitable cooler arrangement for practicing this invention.
Figure 2:
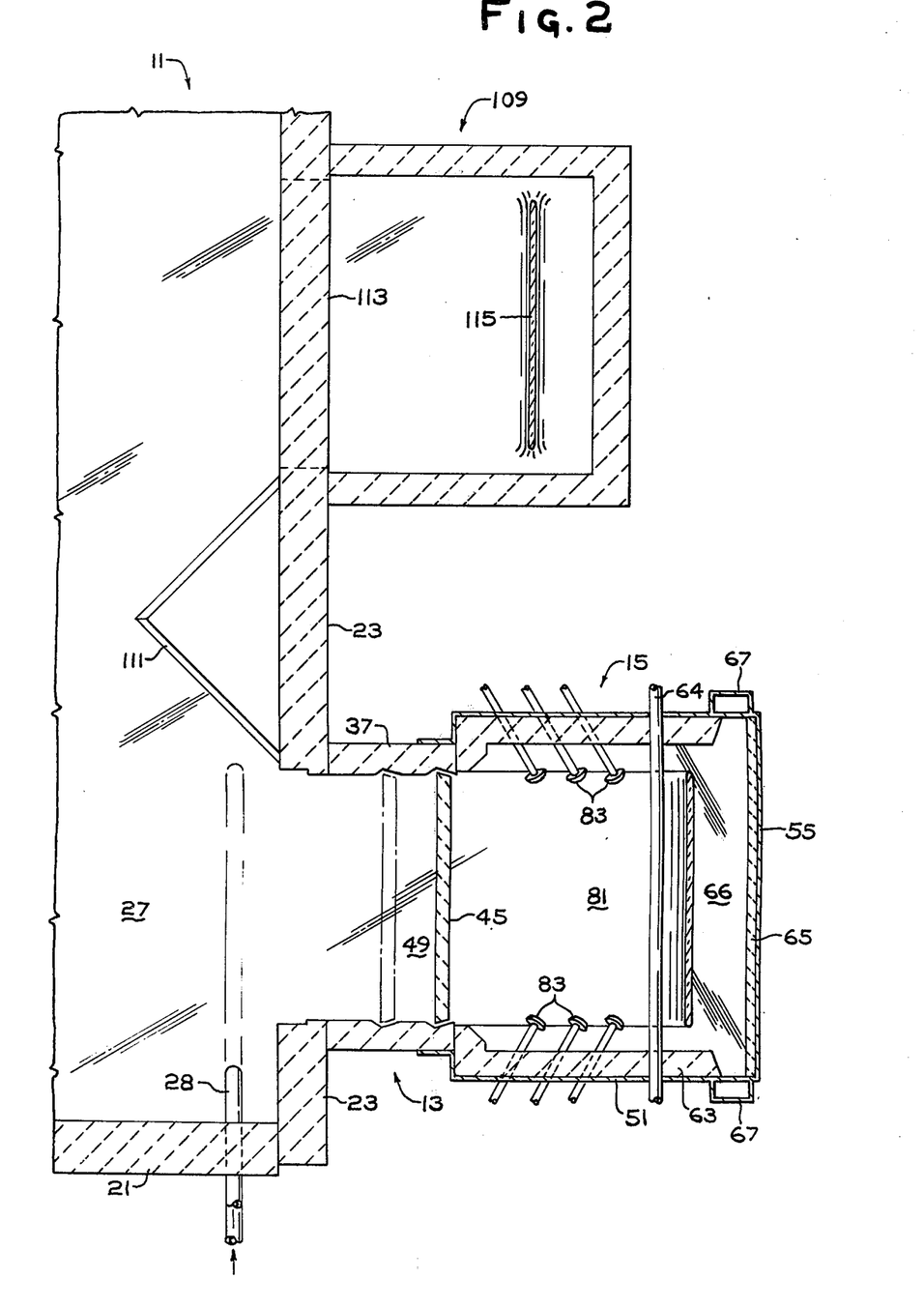
FIG. 2 is a partial sectional plan of the glassmaking furnace, delivery facility and forming chamber illustrated in FIG. 1 showing the unsymmetrical connection of the delivery facility to the furnace in order to accommodate the connection of a second forming facility to the same end wall of the furnace.
Figure 3:
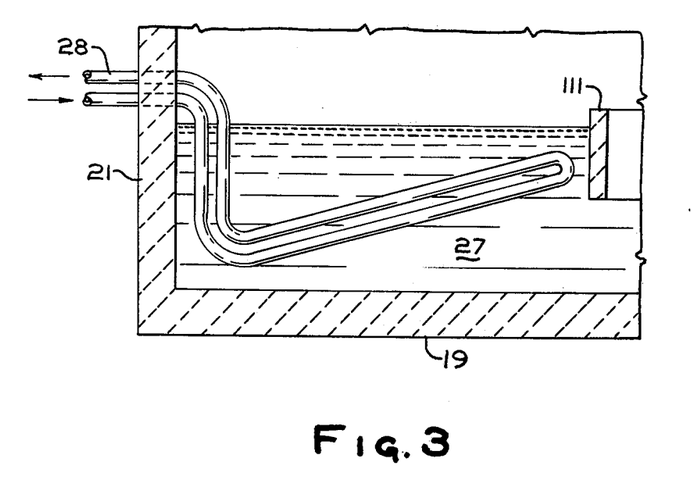
FIG. 3 is a partial transverse or lateral sectional elevation of the delivery facility entrance region of the apparatus shown in FIGS. 1 and 2, the view being taken on section line 3—3 of FIG. 1.

Referring now to FIGS. 1, 2 and 3, there are shown two views of suitable apparatus for carrying out the present invention. The glassmaking apparatus shown in FIGS. 1, 2 and 3 comprises a furnace 11, a delivery facility 13, a forming chamber 15 and a vertical conveyor 17 which may be, and preferably is, included in an annealing lehr.

The glassmaking furnace 11 which is shown in FIGS. 1, 2 and 3 includes a melting section (not shown) and a refiner, the end of which is shown. The refiner or conditioning section of the furnace 11 comprises a furnace bottom 19, side walls 21 and a front basin wall 23. The front basin wall 23 is maintained in position by structural members 24. The furnace further comprises an upper front wall 25, which is preferably suspended or supported from above, and a roof overlying the upper portion of the furnace, the roof not being shown. Contained within the furnace is a pool of molten glass 27 and submerged in the glass and extending transversely across the portion of the furnace serving as an entrance to the delivery facility is a cooler 28. This cooler 28 is sloped with respect to the surface of the pool of molten glass 27 as seen best in FIG. 3. The cooler is closer the surface near the center of the furnace and deeper near the side wall 21 adjacent the delivery facility. The cooler 28 may be rotated so that its higher end that is remote from the side wall 21 is closer to or farther from the delivery facility than the lower end that is closest to side wall 21. This aids in further adjusting the cooling gradient across the width of the entrance region.

The delivery facility 13 includes a threshold 31 resting on a cooling block 33 or other support which is supported by structural member 34. A cast refractory seal 35 or the like is disposed between the threshold 31 and the cooling box 33. Extending through holes in the threshold 31 are conduits or pipes 36 for transporting coolant or the like through the interior of the threshold 31 and for controlling its temperature during use. At the ends of the threshold 31 there are side wall portions or jambs 37 which define the sides of a channel through which molten glass may be delivered from the pool of molten glass 27 residing in the bottom portion of the furnace 11. The top of the delivery facility 13 is defined by a roof 39, generally of flat arch construction, which is supported by supporting means (not shown) extending above it and connected to flat arch holders 40 embedded in the flat arch itself. Extending transversely across the delivery facility 13 are two gates or tweels. The first is a backup tweel 41 connected to a support assembly 43 (not fully shown) for raising and lowering it into engagement with the molten glass in the pool of molten glass 27. The second tweel is a control tweel 45 supported by a support assembly 47 (not fully shown) for raising and lowering the tweel. The tweel is held in operating position in contact with the molten glass to be delivered for forming. The control tweel 45, along with the threshold 31 and the jambs 37, defines an opening through which a layer of molten glass 49 may be delivered for forming.

The forming chamber 15 comprises a bottom casing 51 supported on support 52 in addition to support 34. This casing is preferably a casing constructed of metal, such as steel. The casing is preferably impervious to the molten metal in the chamber. The forming chamber 15 further comprises a top casing 53 and an end casing 55. Both of these casing members are also preferably constructed of impervious metal. Disposed within the bottom casing 51 is a refractory bottom 57, preferably a refractory bottom that has been cast in place inside the bottom casing 51. Preferably embedded within the bottom refractory 57 are pipes 59 through which coolant or other fluid may be directed for controlling the temperatures of the forming chamber 15 at discrete locations along its length.

Also extending transversely across the forming chamber 15 are dams or weirs 61 mounted in the refractory bottom 57 and extending across its width. These dams are preferably inserted in slots and are held down at their ends at each side of the forming chamber. They are preferably constructed of a material that is less dense than the molten metal in the forming chamber so that their vertical position may be varied upwardly or downwardly by controlled adjustment of their holddown devices at their ends.

The forming chamber 15 further comprises refractory side walls 63 and a refractory exit lip 65. These, along with the bottom refractory 57 and the threshold 21, define a container in which a pool of molten metal 66, preferably molten tin or an alloy of tin, is disposed. At the downstream end of the forming chamber there are provided extensions 67 of the bottom container portion of the forming chamber which serve as cavities into which dross floating on the surface of the molten metal 66 may be drawn for removal from the forming chamber. The upper portion of the forming chamber includes an end wall liner 69, preferably constructed of refractory material. This liner 69 and the end casing 55 to which it is connected may include a suitable opening 70 through which a continuous sheet of glass may be withdrawn from the forming chamber along a substantially horizontal path in the event that such removal is desired. Generally, however, such an opening will be closed and sealed as shown. The upper portion of the chamber further includes a lintel 71 at its upstream or inlet end. This lintel 71 may be used as a means for supporting the delivery means roof 39. Additionally, the upper portion of the chamber includes a ceiling or roof 73 preferably or refractory material which is suitable for radiating and absorbing heat uniformly over the area facing the glass beneath it during operation. Extending through the ceiling of the forming chamber are controllable heating elements 75 used to control the rate of heat removal from the glass during forming. These heating elements 75 are connected to bus bars 77 which are connected in turn to a source of power (not shown). The upper portion of the forming chamber 15 preferably includes a top casing end wall 79 which provides a space between the upper portion of the forming chamber 15 and the upstream or furnace side of the conveyor mechanism 17.

Advancing along the surface of the pool of molten tin 66 is a continuous sheet of glass 81 formed from the layer of molten glass 49 delivered onto the pool of molten tin for forming.

Extending into the forming chamber through its side walls are edge contacting devices for applying outward tractive forces to the layer of glass 49 during its advance along the surface of the pool of molten metal for forming. These devices are preferably driven wheels disposed and driven in such manner as to apply opposing outward forces to the glass to maintain its width during attenuation and to cause it to be attenuated to thicknesses less than that which would be attained by the glass if allowed to remain on the surface of the molten metal for sufficient time to come to equilibrium with it.

The vertical conveyor 17 comprises a machine casing 91 and thermally insulated machine walls 93. The machine walls 93 are preferably constructed of refractory material. Within the vertical conveyor there is a series of supporting rolls 95 for engaging a continuous sheet of glass 81 and for conveying it upwardly through the conveyor. These machine rolls are operated in a coordinated manner. They are used to apply sufficient tractive force to the glass to convey it upwardly and to transmit tractive forces along the glass downwardly and about the curved glass to the hotter, more fluid glass within the advancing layer of glass on the surface of the pool of molten metal in the forming chamber. Disposed across the internal space within the conveyor casing at several intervals along its length are machine seals 97 for retarding the flow of gases either upwardly or downwardly through the enclosed space surrounding the rolls 95. Extending through the walls of the enclosed conveyor are openings 99 through which cullet may be directed in the event the continuous sheet of glass is chipped or broken in an upper portion of the conveyor. A space is provided between the top casing of the forming chamber and the wall of the vertical conveyor for accommodating cullet removal. This space is characterized as a cullet chamber 101.

In a preferred embodiment of this invention, coolers 103 are disposed across the bottom of the vertical conveyor to control the removal of heat from a continuous sheet of glass 81 as it is conveyed upwardly from the surface of the pool of molten metal in the forming chamber.

Referring now specifically to FIG. 2 there is shown a glassmaking furnace 11 to which there is connected, in addition to a glass forming and conveying apparatus in accordance with this invention, a conventional sheet drawing kiln 109. The sheet drawing kiln and the delivery means 13 of the present apparatus suitable for carrying out the practice of this invention are separated from one another by a diverter 111 disposed within the refiner portion of the furnace 11. A conventional shutoff 113 extends across the opening of the drawing kiln 109 and the location of a sheet of glass drawn from a meniscus 115 is shown in the drawing. Of course, a second forming chamber similar to forming chamber 15 could be connected to the furnace 11 in place of the illustrated drawing kiln 109.

With an understanding of a suitable apparatus for use in practicing this invention, the method of making glass according to this invention may be readily appreciated. The following embodiment of this invention exemplifies it:

Raw batch materials are blended and fed along with cullet to the melter of a glassmaking furnace. These materials are melted to form a pool of molten glass, filling the lower portion of both the melter and refiner of the furnace. Molten glass flows from the melter to the refiner and, by control of temperatures within the pool of molten glass, convective flows also occur within the pool. As the molten glass passes through the refiner, it is gradually cooled and refined.

As the molten glass near the surface of the pool of molten glass flows over the sloped, submerged cooler 28, it is caused to flow substantially uniformly across the width of the entrance region (that width being effectively the length of the cooler 28). The hotter glass coming near the shallow end of the cooler is subjected to a driving force acting over the short space between the surface and the cooler, and the cooler glass coming near the deep end of the cooler is subjected to a drawing force acting over the long space between the surface and the cooler. There is incidental to this a preferential cooling of the hotter glass at the surface of the pool near the center of the furnace while the cooler glass at the surface of the pool over the more deeply submerged portion of the cooler is cooled less. Thus, the temperature, as well as the velocity, of the glass flowing toward delivery is made more uniform across the width of the entrance to the delivery facility.

Molten glass is then discharged from the pool of molten glass 27, in the refiner 11 and delivered over the threshold 31 and onto the surface of the pool of molten metal 66 in the forming chamber 15. There, the delivered layer 49 of molten glass is advanced from the vicinity of the threshold 31 toward the location for lifting a sheet of glass 81 from the pool of molten metal. As the glass is advanced, it is gradually cooled and outward forces are applied to it by the rotation of the angled edge wheels 83. Water is directed through the pipes 59 embedded in the bottom 57 of the forming chamber 15 and the dams 61 are positioned so that their upper surfaces are in close proximity to the surface of the pool of molten metal. In this way the glass is uniformly cooled as it advances over the spaces between adjacent dams. The heating elements 75 in the ceiling 73 of the forming chamber form a matrix having at least three separately controllable heater zones across the width of the chamber. They are separately controlled to cause the central portion of the advancing layer of glass to cool at least about as rapidly as the marginal portions of the advancing layer of glass.

The glass is cooled as it advances along the surface of the pool of molten metal. Shortly after the glass has passed from beneath the final pair of edge wheels, it has assumed its ultimate width and thickness and is sufficiently cooled as to lack susceptibility to further stretching or attenuation. The glass is then a dimensionally stable, continuous sheet 81 of glass.

As the dimensionally stable, continuous sheet 81 of glass is advanced along the surface of the pool of molten metal 66, it further cooled, and desirably its temperatures at all locations through its thickness and across its width are caused to approach a common temperature by controllably cooling the glass from both above using cooler 64 and from below using the embedded coolers 59 in the vicinity of glass lift-off. In this way the glass will be substantially free of stress as it approaches the location at which it is to be lifted from the pool of molten metal. Desirably, the glass is cooled to a temperature such that its viscosity will be between $10^5$ to $10^{10}$ poises for lifting.

The dimensionally stable, continuous sheet of glass is then lifted upwardly from the surface of the molten metal and is conveyed upwardly from the forming chamber in the manner described in the referenced copending application of Kunkle.

Figure 4:
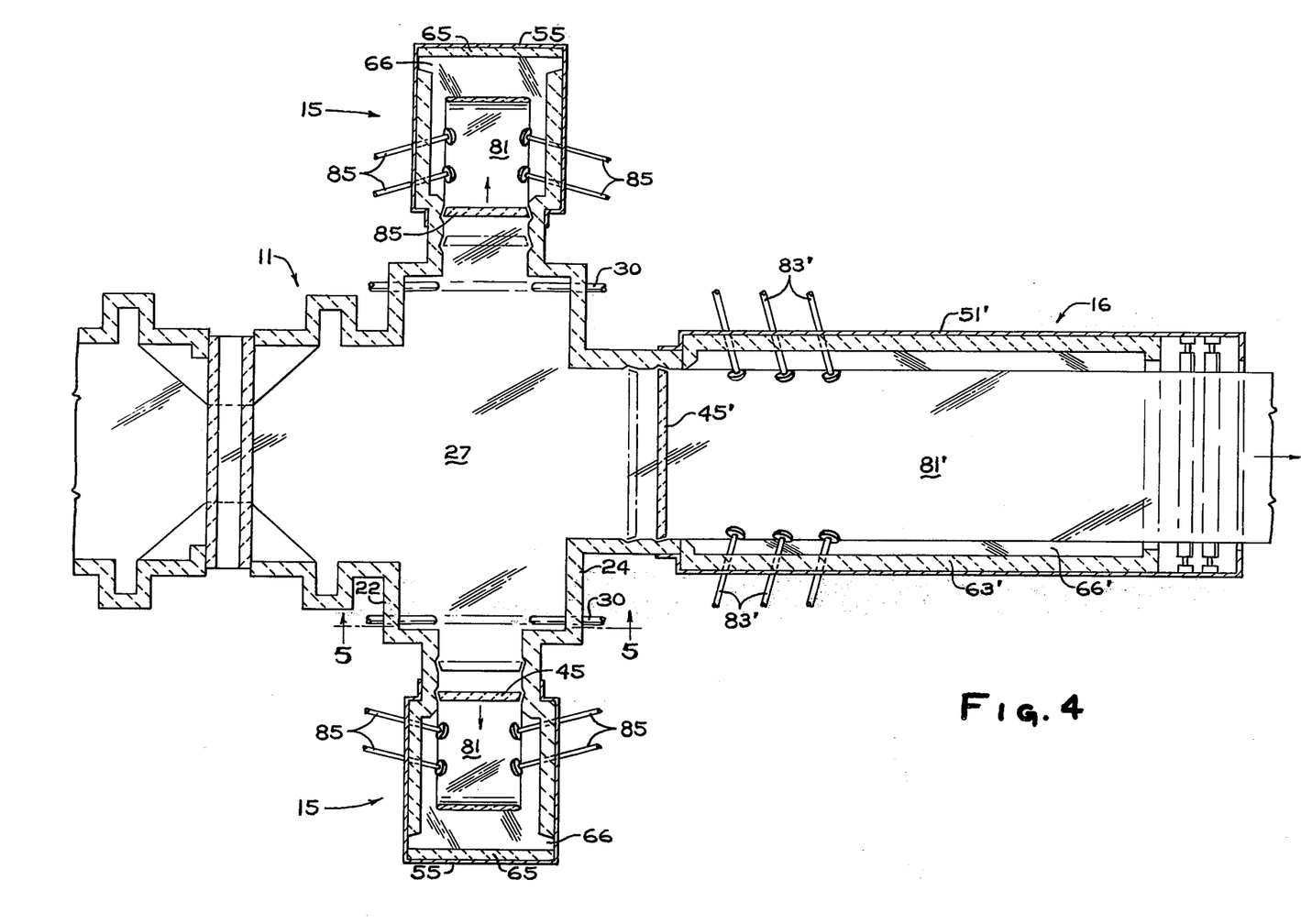
FIG. 4 is a partial sectional plan view of a glassmaking furnace having three forming chambers connected to it, one at its front end wall and two at its opposing side walls.
Figure 5:
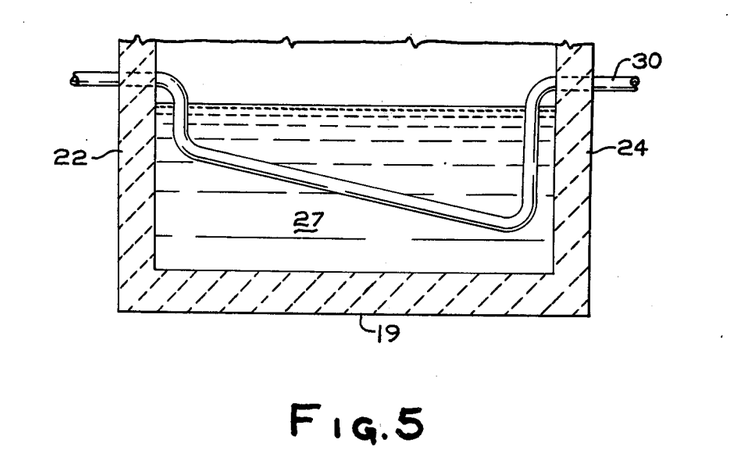
FIG. 5 is a partial sectional elevation of an entrance region serving a side wall delivery facility and forming chamber of the apparatus shown in FIG. 4, the view being taken on section line 5—5 of FIG. 4.

Referring now to FIGS. 4 and 5, there is seen another embodiment of this invention. A glassmaking facility is shown which comprises a furnace 11 including a melter and refiner with three flat glass forming chambers connected to it. Two glass forming chambers 15 are connected to the refiner of the furnace 11 through its side walls. One glass forming chamber 16 is connected to the refiner of the furnace 11 through its front wall. The side forming chambers 15 are of the kind already described.

Molten glass is delivered from a pool of molten glass 27 in the refiner to the side forming chambers 15 and there it is formed into a continuous sheet of flat glass 81. The molten glass delivery is controlled by a tweel 45, and the glass is outwardly constrained by edge wheel apparatus 85 during forming. During forming the glass 81 is supported on molten metal 66 which is contained within the refractory liner 65 of the forming chamber casing 55.

Prior to delivery to the forming chamber the molten glass in the refiner is subjected to thermal conditioning to controllably maintain its temperature and to control and enhance its flow into the forming chamber. This is accomplished by providing submerged coolers 30 across the entrances of the side forming chambers 15. The coolers 30, as seen in FIG. 5, are sloped with a shallow end closest the upstream or feed end of the furnace where batch materials are fed to the melting section of the furnace. Since there is general cooling of the molten glass as it passes through the refiner or conditioning section of a furnace, the molten glass close to an upstream entrance wall 22 is hotter than that near a downstream entrance wall 24. The coolers 30 serve to cause the flow of molten glass to uniformly flow into the forming chambers connected to the side walls. These forming chambers 15 are like the forming chamber 15 of FIGS. 1, 2 and 3.

A forming chamber 16 having a substantially horizontal liftoff for glass at its exit end is connected to the refiner through its front wall. This forming chamber has at its entrance end a molten glass delivery facility including a tweel 45' for controlling the rate at which a layer of molten glass is delivered for forming. The bottom of the forming chamber includes a casing 51' having a refractory liner 63' containing a pool of molten metal 66' for supporting the glass during the forming of a continuous sheet of glass 81'. During such forming the glass may be outwardly constrained by forces applied to it by edge wheels 83' or other edge constraining devices. Once formed the glass sheet 81' is advanced along the surface of the pool of molten metal 66' and cooled until its temperature is sufficiently low as to avoid ready marking by contact with a solid object and to avoid substantial sagging between support points if supported in a horizontal position. The sheet of glass 81' is then lifted slightly (5° to 20° from the horizontal) over an exit lip and onto the first of a series of conveyor rolls called "lift-out" rolls. The sheet of glass 81' is then permitted to again assume a horizontal position as it is conveyed from the forming chamber to an annealing lehr.

A glassmaking facility having a furnace such as just described is well suited for the production of a variety of flat glass products to supply many differing market needs. Also, the space of a plant site is efficiently utilized by a glassmaking facility of this kind. The two side forming chambers produce glass sheets that are conveyed upwardly to cutting and processing floors located above the end forming chamber and its subsequent annealing lehr. Cooling conveyors carrying cut cap sizes of glass sheets from the side forming chambers may run over the space above the end forming chamber and its lehr to utilize the waste heat rising from them to gradually cool the glass in a controlled thermal environment. Meanwhile, the glass sheet from the end forming chamber may proceed at the lower elevation to cutting and processing stations. The glass from the side forming chambers may be conveyed after cutting down to the lower elevation to meet the glass from the end forming chamber in a common packing and shipping area. This provides substantial flexibility for filling orders for mixtures of glass sizes and thicknesses.

Figure 6:
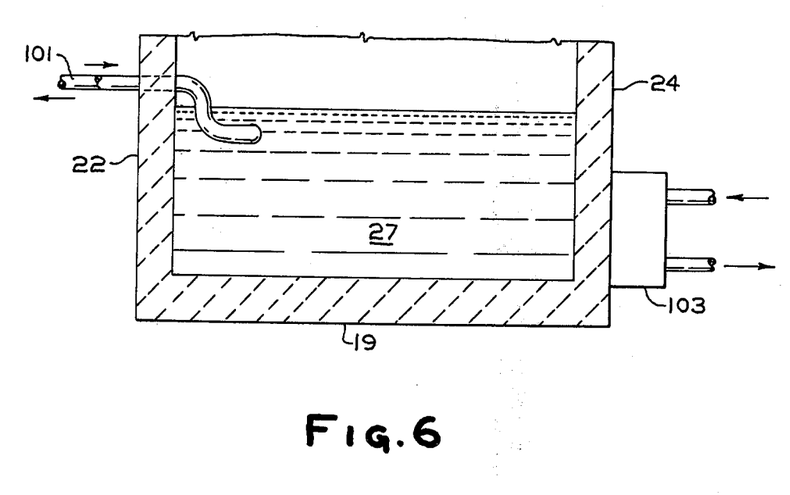
FIG. 6 is a partial sectional elevation of an entrance region such as shown in FIG. 5 but illustrating a cooler combination comprising separate coolers, one on one side of the entrance and one on the other.
Figure 7:
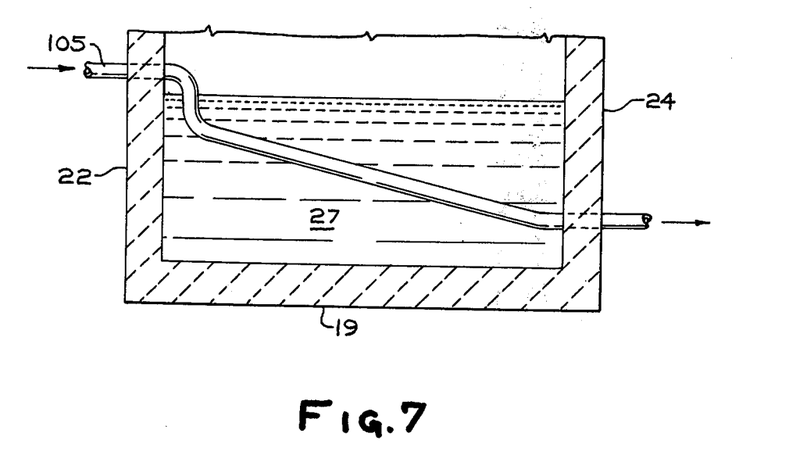
FIG. 7 is a partial sectional elevation of an entrance region such as shown in FIGS. 5 and 6, but illustrating a sloped cooler entering the region from beneath the glass line.

Referring now to FIGS. 6 and 7, there are shown two other embodiments of this invention. In FIG. 6 a pair of separate coolers are shown. One cooler 101 is slightly submerged in the pool of molten glass 27 near the hot or upstream side wall member of an entrance region for a side wall connected forming chamber. A second cooler 103 is mounted on the outer face of downstream side wall member 24 beneath the surface of the pool of molten glass 27. This combination is effective for carrying out the invention and simple to use and maintain since both coolers are easily installed, moved to desirable positions or removed as needed. In some instances it is possible to use either cooler 101 or cooler 103 alone.

In FIG. 7 there is shown a cooler 105 that is sloped and extends across an entrance region from one wall member 22 to the other wall member 24. The cooler conduit extends through wall member 24 beneath the glass surface. This arrangement permits glass cooling at the deeply submerged end of the cooler without unnecessary cooling of glass along a vertical extention of the cooler to carry coolant to or from the submerged end when the cooler extends from the glass in the manner of the cooler shown in FIG. 5.

While the several embodiments of this invention have been described and illustrated by reference to detailed specific examples, those skilled in the art will recognize that variations may be made from the described methods and devices without departing from the substance of this invention.

We claim:

1. In the method of continuously forming a layer of glass on a supporting pool of molten metal wherein molten glass is discharged from a region of a pool of molten glass having an upper surface and the discharged molten glass is delivered substantially horizontally from the discharge region as a layer having a first edge portion and a second edge portion onto the supporting pool of molten metal which has an upper surface at substantially the same elevation as that of the discharged layer of glass, the improvement comprising
   the step of cooling the molten glass adjacent the discharge region sufficiently to cause molten glass in the layer of molten glass within the pool of molten glass to flow toward the discharge region wherein molten glass immediately subjacent the surface of the pool of molten glass being discharged as the first edge portion is cooled at a greater rate than is molten glass at the same depth subjacent the surface of the pool of molten glass which is being discharged as the second edge portion, the difference in cooling being sufficient to cause the molten glass of both edge portions to be discharged at substantially the same velocity.

2. The method according to claim 1 wherein the layer of molten glass is discharged from a pool of molten glass contained in a glassmaking furnace having side walls and providing a path between the side walls and substantially parallel to them for the general movement of molten glass through the furnace, wherein the layer of molten glass is discharged along a path offset from the path of general glass movement, and wherein said greater cooling of molten glass is accomplished at a location closer to the path of general glass movement than to a side wall of the furnace.

3. The method according to claim 1 wherein the layer of molten glass is discharged from a pool of molten glass contained in a glassmaking furnace having a melter and a refiner having side walls and the discharge is through an opening in a refiner side wall, the opening having a side closest the melter, and wherein said greater cooling of molten glass is accomplished at a location closer to the side of the opening closest to the melter than to the other side of the opening.

4. In an apparatus for making flat glass comprising
   a glass melter; a glass refiner and conditioner having side walls extending from the glass melter and an end wall joining the side walls at their ends remote from the glass melter, the glass refiner and conditioner being adapted for containing a pool of molten glass and for adjusting its temperature for discharge and delivery to a forming chamber; a forming chamber containing a pool of molten metal for supporting glass during forming connected to the glass conditioner through a delivery facility adapted for delivering a layer of molten glass having a first edge and a second edge along a substantially horizontal path onto the pool of molten metal in the forming chamber; means for advancing the delivered glass along the surface of the pool of molten metal and cooling the glass to form a continuous sheet of glass; and means for withdrawing the formed continuous sheet of glass from the forming chamber and conveying it therefrom; the improvement comprising means for cooling the molten glass immediately subjacent the surface of the pool of molten glass and adjacent to a region in the refiner and conditioner for discharging the layer of molten glass through the delivery facility, said cooling means being adapted for cooling a portion of molten glass to be discharged and delivered as the first edge of the layer of glass to a greater extent than a portion of molten glass to be discharged and delivered as the second edge of the layer of glass and having capacity for cooling the molten glass portions sufficiently differently for causing the molten glass of both edge portions to be discharged at substantially the same velocity.

5. The apparatus according to claim 4 wherein the delivery facility is connected to the end wall of the furnace through an opening in the end wall, the opening having two sides, a first side remotely spaced from a first side wall of the furnace and a second side closely spaced from a second side wall, and wherein the cooling means is adapted for cooling to a greater extent the molten glass immediately subjacent the surface of the pool of molten glass at a location adjacent the side of the opening remotely spaced from the first side wall than for cooling the molten glass immediately subjacent the surface of the pool of molten glass at a location adjacent the side of the opening closely spaced from the second side wall.

6. The apparatus according to claim 5 wherein said cooling means comprises a conduit adapted for having a coolant directed through it, said conduit extending at least partially across the glass conditioner and spaced from the end wall and sloping downwardly from a first end submerged in the pool of molten glass at a location adjacent the first side of the opening to a second end more deeply submerged than the first end and located adjacent the second side of the opening.

7. The apparatus according to claim 6 wherein said conduit extends across a region in the glass conditioner having refractory wall members and through at least one of said members such that a portion of said conduit adjacent the more deeply submerged second end of said conduit passes through said member.

8. The apparatus according to claim 4 wherein the delivery facility is connected to a side wall of the furnace through an opening in the side wall, the opening having two sides, a first side spaced closest to the melter and a second side spaced farthest from the melter, and wherein the cooling means is adapted for cooling to a greater extent the molten glass immediately subjacent the surface of the pool of molten glass at a location adjacent the first side of the opening spaced closest to the melter.

9. The apparatus according to claim 8 wherein said cooling means comprises a conduit adapted for having a coolant directed through it, said conduit extending at least partially across a discharge region in the glass conditioner adjacent the opening, and said conduit sloping downwardly from a first end submerged in the pool of molten glass at a location adjacent the first side of the opening to a second end more deeply submerged than the first end and located adjacent the second side of the opening.

10. The apparatus according to claim 9 wherein said conduit extends across a region in the glass conditioner having refractory wall members and through at least one of said members such that a portion of said conduit adjacent the more deeply submerged second end of said conduit passes through said member.

11. The apparatus according to claim 4 wherein the cooling means comprises two coolers, a first cooler located substantially adjacent molten glass immediately subjacent the surface of the pool of molten glass and a second cooler located substantially adjacent molten glass a greater depth beneath the surface of the pool of molten glass, the coolers being spaced one from the other providing for molten glass to flow between them toward the delivery facility.

12. The apparatus according to claim 11 wherein at least one of said coolers is submerged in the pool of molten glass.

13. The apparatus according to claim 12 wherein the first cooler is submerged in the pool of molten glass.

14. The apparatus according to claim 11 wherein at least one of said coolers is located outside the glassmaking furnace adjacent a wall member for confining molten glass in a discharge region of the furnace.

15. The apparatus according to claim 14 wherein the second cooler is located outside the glassmaking furnace.

* * * * *